United States Patent [19]

Beaver et al.

[11] Patent Number: 5,331,841
[45] Date of Patent: Jul. 26, 1994

[54] METHOD AND APPARATUS FOR REPAIRING VESSEL PORTS

[75] Inventors: Phillip R. Beaver; James R. Meyer; Thomas E. Henke, all of Baton Rouge, La.

[73] Assignee: Albemarle Corporation, Richmond, Va.

[21] Appl. No.: 919,193

[22] Filed: Jul. 24, 1992

Related U.S. Application Data

[63] Continuation-in-part of Ser. No. 652,982, Feb. 11, 1991, Pat. No. 5,149,105.

[51] Int. Cl.⁵ ............................................. G01M 3/04
[52] U.S. Cl. .................................... 73/49.2; 73/40.7; 73/49.8
[58] Field of Search .............. 73/40.5 R, 40.7, 46, 73/49.2, 49.8; 220/465, 233, 234, 601; 277/1, 2, 3, 70

[56] References Cited

U.S. PATENT DOCUMENTS

| | | | |
|---|---|---|---|
| 2,478,628 | 8/1949 | Hansen | 73/46 |
| 3,349,951 | 10/1967 | Peterson | 220/63 |
| 4,283,937 | 8/1981 | Aoki et al. | 73/49.3 |
| 4,335,883 | 6/1982 | Le Roux et al. | 277/3 |
| 4,344,320 | 8/1982 | Haupt et al. | 73/40.7 |
| 4,440,309 | 4/1984 | Morimoto | 220/235 |
| 4,505,186 | 3/1985 | Meier et al. | 92/5 R |
| 4,574,618 | 3/1986 | Anthony et al. | 73/46 |
| 4,674,321 | 6/1987 | Joshi | 73/40.7 |
| 4,699,294 | 10/1987 | Carlin, Jr. | 220/465 |
| 4,715,213 | 12/1987 | McGreehan et al. | 73/40.7 |
| 5,056,680 | 10/1991 | Sharp | 220/465 |

OTHER PUBLICATIONS

Lerman et al., "Maximize the Life of Glass-Lined Reactors", Chemical Engineering Progress, Dec., 1991, pp. 37-45.

News & Notes Brochure: Kwik-Sleeve TM by De Dietrich (USA), Inc., No. 22, Issued Sep. 1990.

News & Notes Brochure: Kwik-Fix TM by De Dietrich (USA), Inc., No. 17, Revised Jul. 1988.

Primary Examiner—Hezron E. Williams
Assistant Examiner—Michael Brock
Attorney, Agent, or Firm—E. E. Spielman, Jr.

[57] ABSTRACT

This invention relates to a process and apparatus for repairing a port of a vessel, the port having an inside surface which is damaged. The method and apparatus utilize a liner means for lining the inner surface of the port, a sealed chamber between the lining means and the inner surface of the vessel port, a means of using a gas, preferably an inert gas, to purge the sealed chamber, and a means of monitoring the gas which is purged from the chamber.

15 Claims, 10 Drawing Sheets

METHOD AND APPARATUS FOR REPAIRING VESSEL PORTS

This application is a continuation-in-part of copending application Ser. No. 07/652,982, filed Feb. 11, 1991, now U.S. Pat. No. 5,149,105.

BACKGROUND OF THE INVENTION

This invention relates to an apparatus and a method for repairing and/or monitoring the integrity of a repair to a vessel port.

Vessels used in corrosive and hazardous chemical services are often manufactured from exotic metals such as titanium, tantalum, nickel, nickel/copper alloys, nickel/chromium alloys, nickel/molybdenum alloys, etc. These materials, while providing a measure of protection against leakage of the corrosive, hazardous, and/or lethal materials are not without drawbacks. Vessels manufactured out of exotic materials are frequently more expensive and usually require sophisticated fabrication techniques.

In order to obtain the advantages of increased corrosion resistance and safety which may be found in vessels manufactured out of exotic materials without the disadvantages noted above, lined vessels are used in corrosive and hazardous chemical service. The vessel liners may be in the form of corrosion resistant coatings or paints, exotic metals, natural or synthetic rubber, graphite, glass, ceramic, fluorocarbon compounds such as TEFLON ® or KYNAR ® resins, fiberglass reinforced plastics (FRP), and the like. Generally, lined vessels are fabricated from an inexpensive metal or plastic substrate which provides mechanical and structural support for the liner. The substrate is usually not resistant to corrosion but is protected, nonetheless, from corrosion by the vessel liner.

During its life, the lined vessel is frequently subjected to conditions which decrease the useful life of the vessel due to damage to or failure of the vessels liner. Conditions which may decrease the life of the lined vessel include uncontrolled, rapid heating or cooling of the vessels or vessel contents, exposure of the vessel liner to materials for which the vessel is not designed, poor maintenance practices, exposure of the vessel substrate to corrosive materials, and the like. Furthermore, pinholes and cracks may develop in glass, rubber, metal, and plastic liners due to abuse of the liners during vessel maintenance, corrosion, and/or erosion.

A particular likely area of lined vessel failure occurs in the vessel ports or flanged connections, particularly on the flange face of the port whereon the vessel liner terminates. Damage to the liner on the face of the flange may be due to improper flange alignment, gasket leakage, improper tightening of the flanges, striking the flange face with a foreign object, the presence of a foreign material between the mating flange surfaces, and the like. Another likely damaged region is between the flange and the vessel, in the throat of the nozzle. In order to utilize a vessel having a damaged liner in the port area of a vessel, it is desirable to repair the port in order to inhibit corrosion of the vessel substrate.

Until now, methods and apparatus for repairing or sealing off a damaged vessel port have not provided adequate means for detecting the presence of or preventing leakage of corrosive materials past the repair to the area of the vessel port which is no longer sufficiently protected by the vessel liner. One means which is used for repairing a damaged glass liner is to i) abrade the damaged substrate and repair the area with an acceptable filling material, such as a weld, and ii) cover and seal the damaged area with a TEFLON ® insert or tantalum liner with a TEFLON ® seal, then to back fill the sealed area with a filler material such as Pfauder ® S-Filler/Boot Filler or SILOXIRANE ® C2131 putty. Examples of such conventional means are the De Dietrich Kwik-Fix ™ PTFE Nozzle Repair Insert and the De Dietrich Kwick ™ Sleeve Insert. It is understood that the portions of the accompanying figures (such as portions 102, 601, 806 and 926) illustrating the damaged sections of the port are drawn to illustrate completion of the abrading and repairing/filling procedure mentioned above.

The disadvantage of this method and apparatus is that leakage past the repair can occur due to imperfections in the insert, sealing material and vessel liner as well as permeation of a corrosive material through the insert or seal. It is well known that Teflon ® resin is permeable to halogens, such as chlorine and bromine. Furthermore, when the operating pressure inside the lined vessel exceeds the pressure downstream of the insert, leakage or permeation through the sealing material is more likely to occur. When such leakage or permeation occurs, the Filler may be attacked by degrading materials such as bromine or chlorine and the repaired substrate may be quickly destroyed. There is a need therefore for an apparatus and method for repairing a vessel port which not only protects the vessel substrate exposed to liner failure and allows continued operation of the port, but also allows monitoring of the integrity of the repair while the port is in continued operation.

SUMMARY OF THE INVENTION

This invention relates to a method and an apparatus for repairing a port of a vessel, the port having an inside surface which is damaged. The apparatus comprises: (a) a lining means for lining the inner surface of the port and providing an open passage for materials passing through the port, (b) a means of passing a gas, preferably an inert gas, between the lining means and the structure of the original port and (c) one or more means for creating a seal between the lining means and the inside surface of the original port. It is understood that the means for creating a seal also functions to secure the lining means into an operable position within the port. This invention also relates to an apparatus for inserting one embodiment of the present invention's lining means into a port.

DESCRIPTION OF THE DRAWINGS

FIG. I provides a vertical, cross-sectional view of one embodiment of the present invention as it is positioned when installed in a vessel port.

FIGS. II-V provide vertical, cross-sectional views depicting steps for inserting and positioning the apparatus of FIG. I into a vessel port.

FIG. VI illustrates a vertical, cross-sectional view of a further embodiment of the present invention.

FIG. VII provides a view in perspective of a preferred embodiment of the present invention.

FIG. VIII provides a vertical, cross-sectional view of another embodiment of the present invention.

FIG. IX provides a vertical, cross-sectional view of a final embodiment of the present invention.

FIG. X provides another vertical, cross-sectional view of the embodiment illustrated in FIG. IX.

DESCRIPTION OF THE PREFERRED EMBODIMENTS

Figure 1:
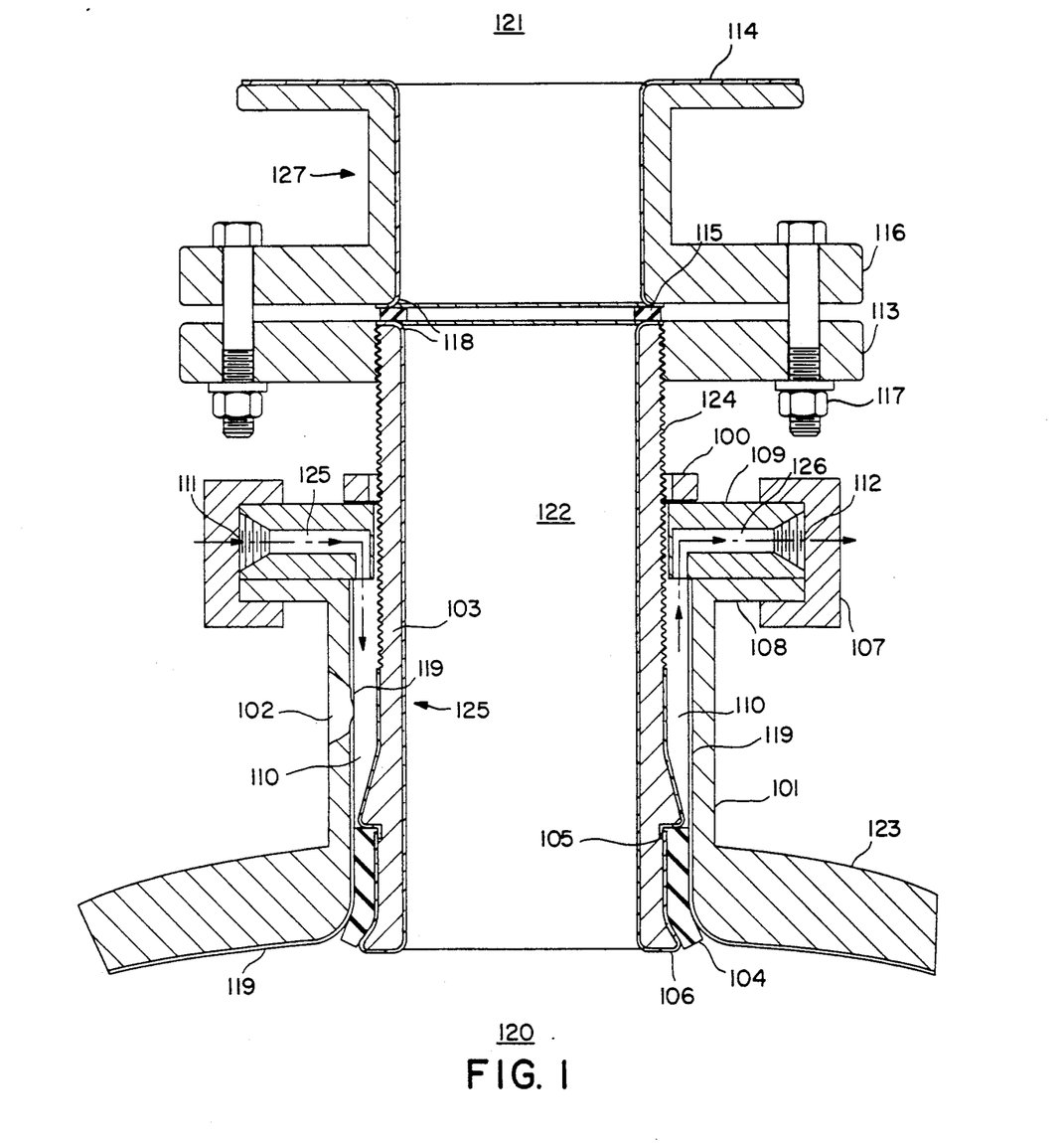
Figure 2:
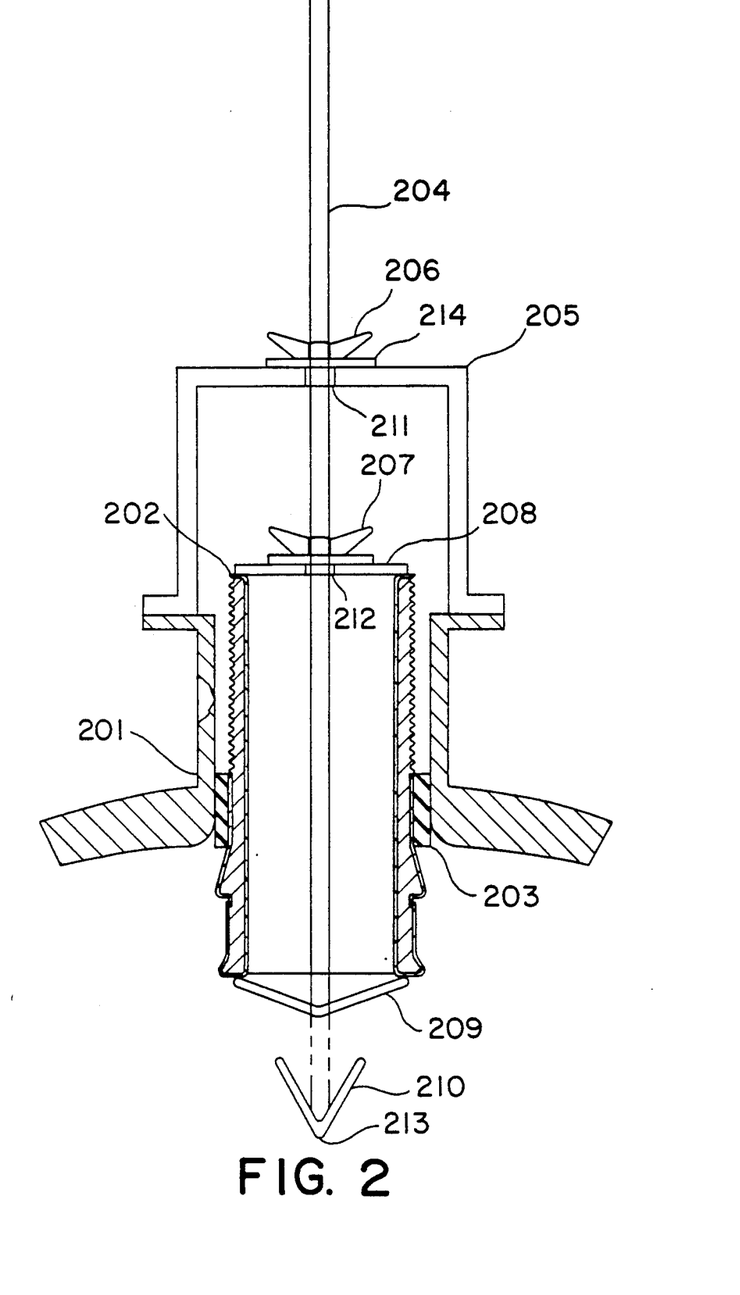
Figure 3:
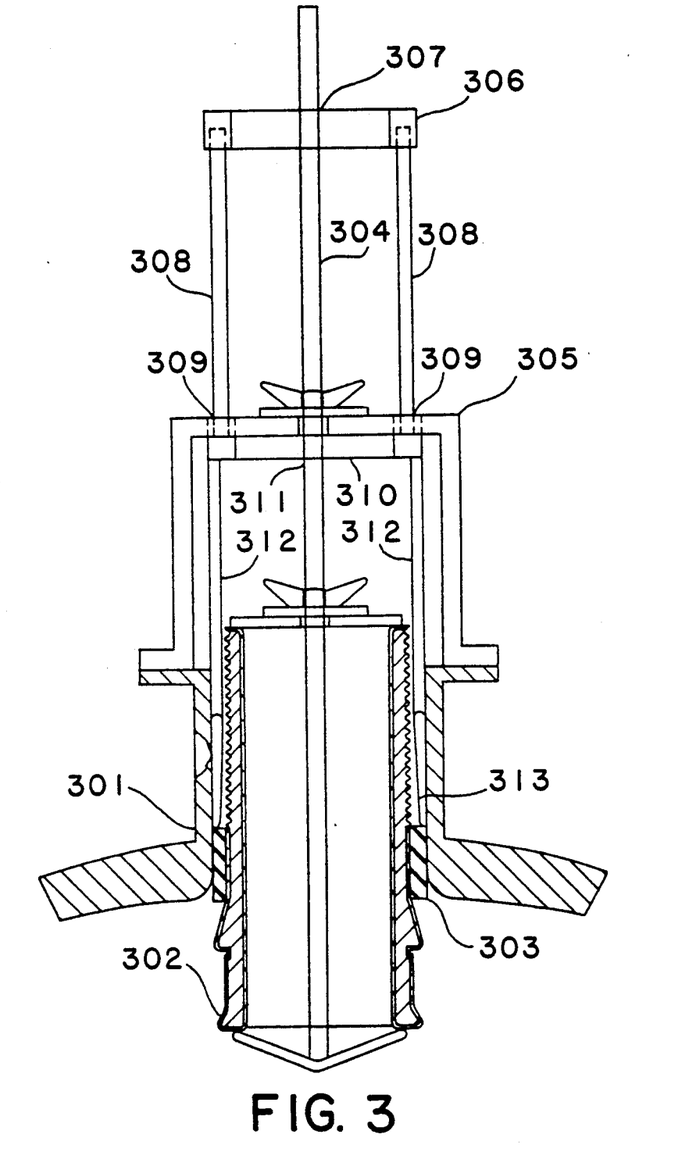
Figure 4:
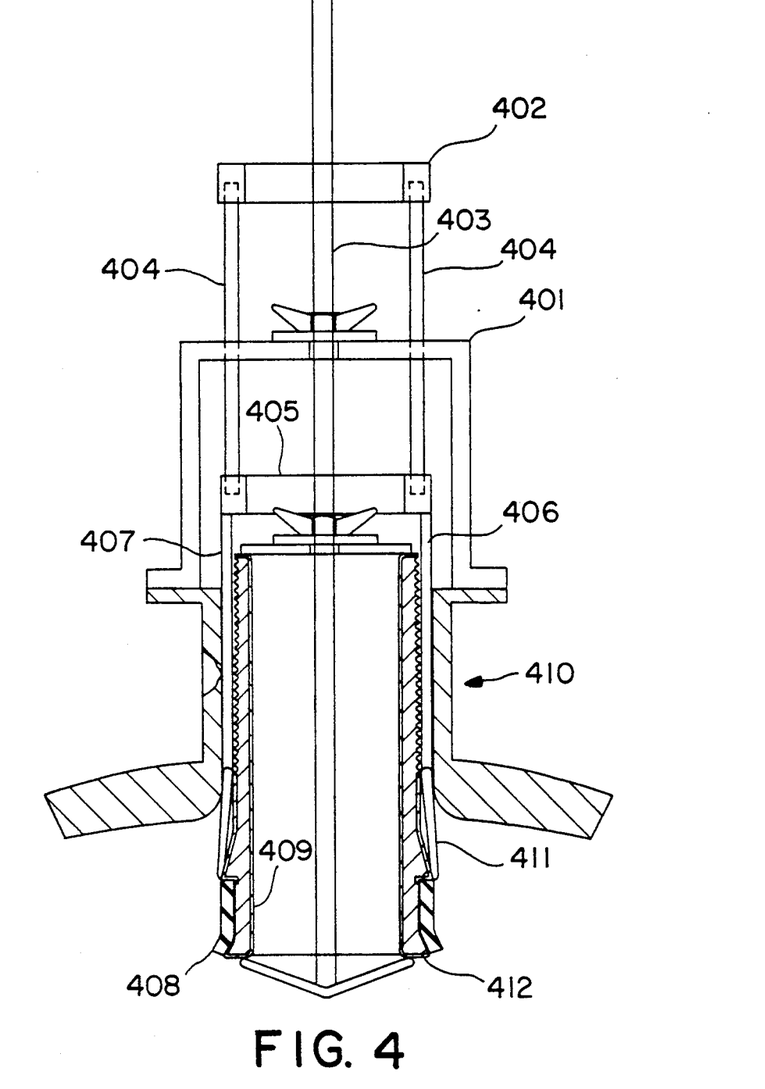
Figure 5:
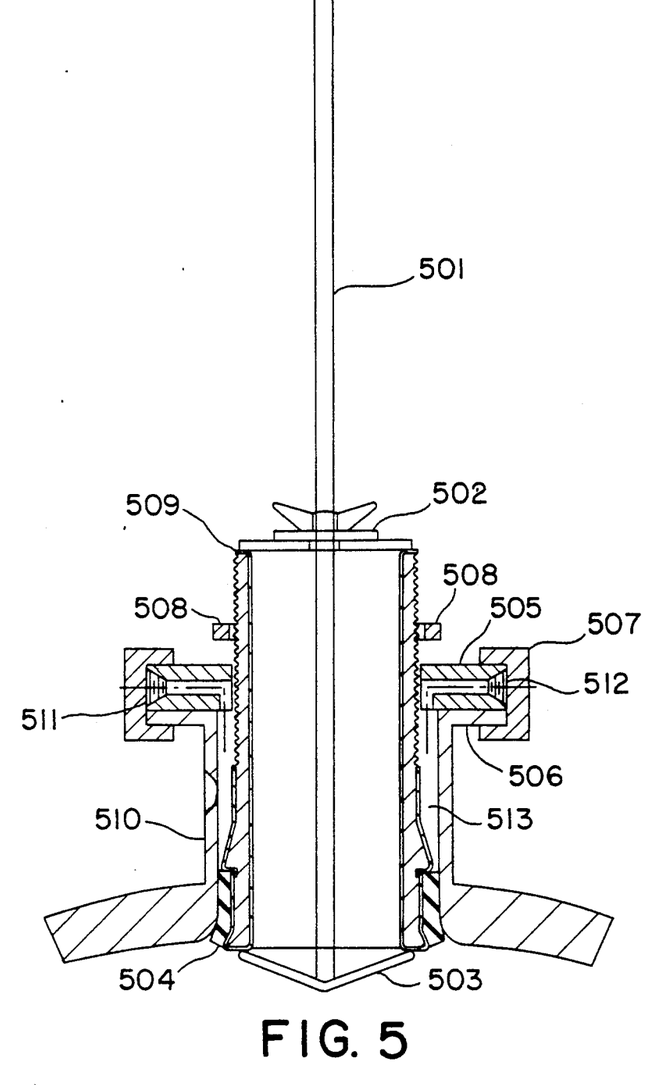
Figure 6:
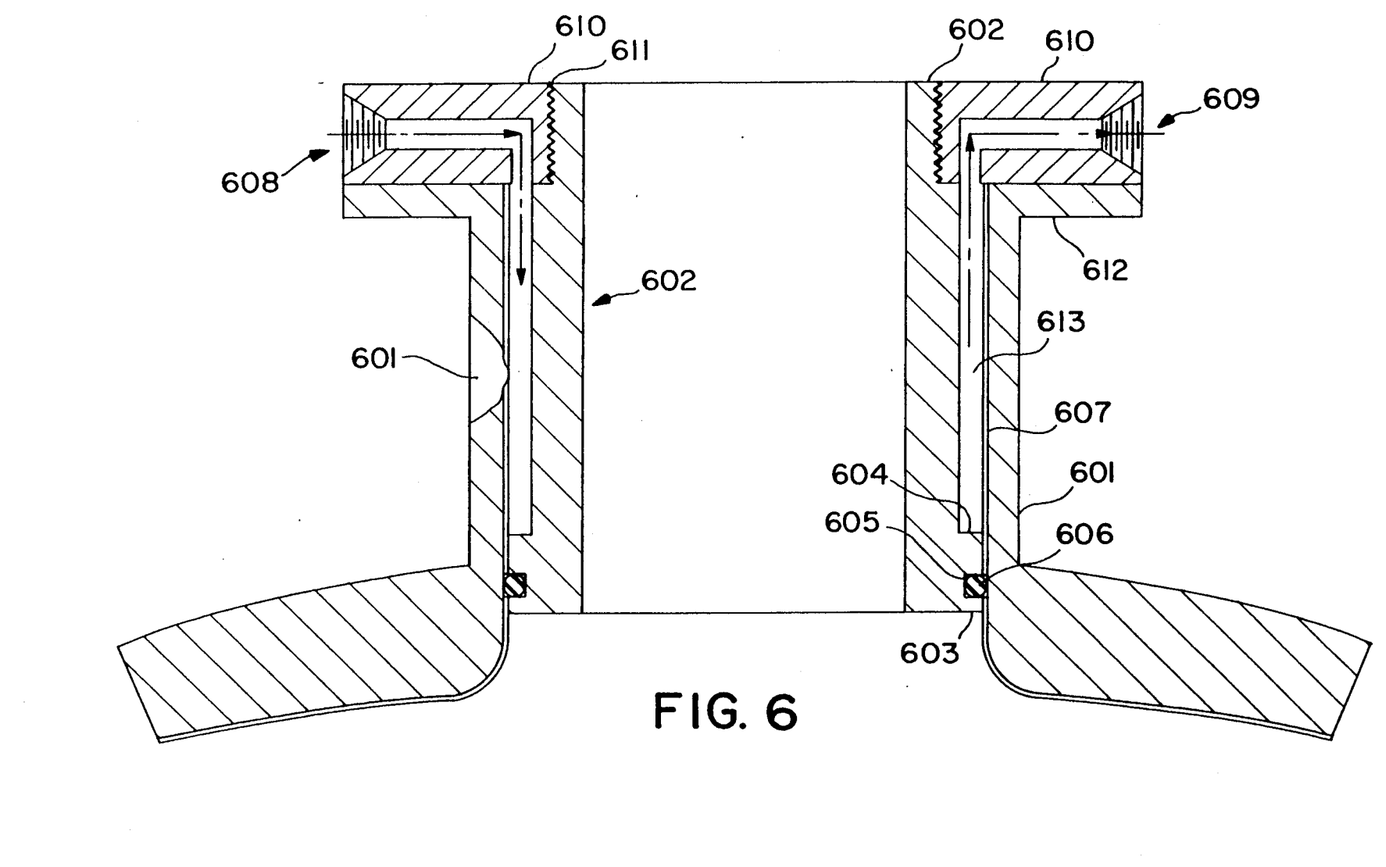
Figure 7:
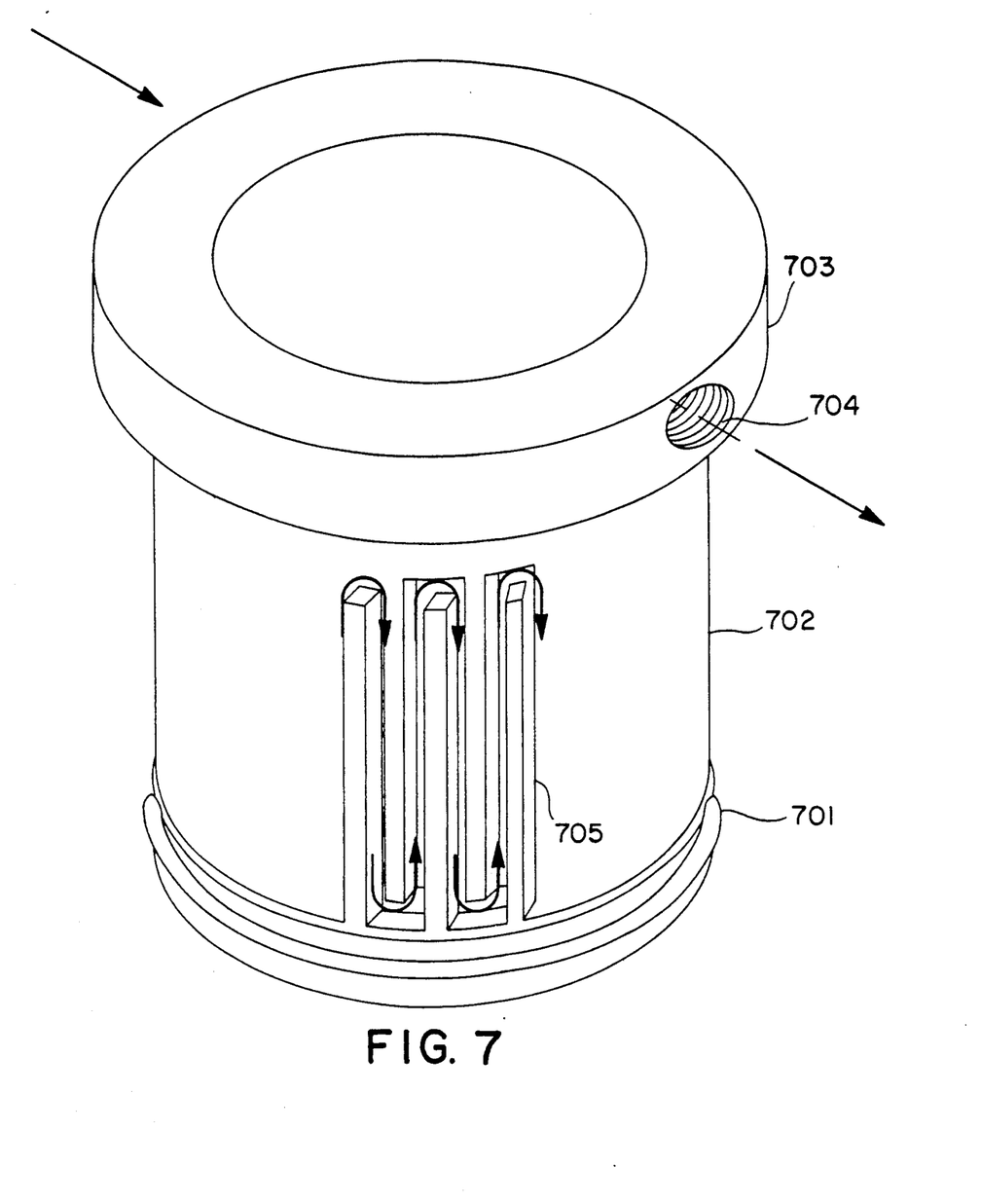
Figure 8:
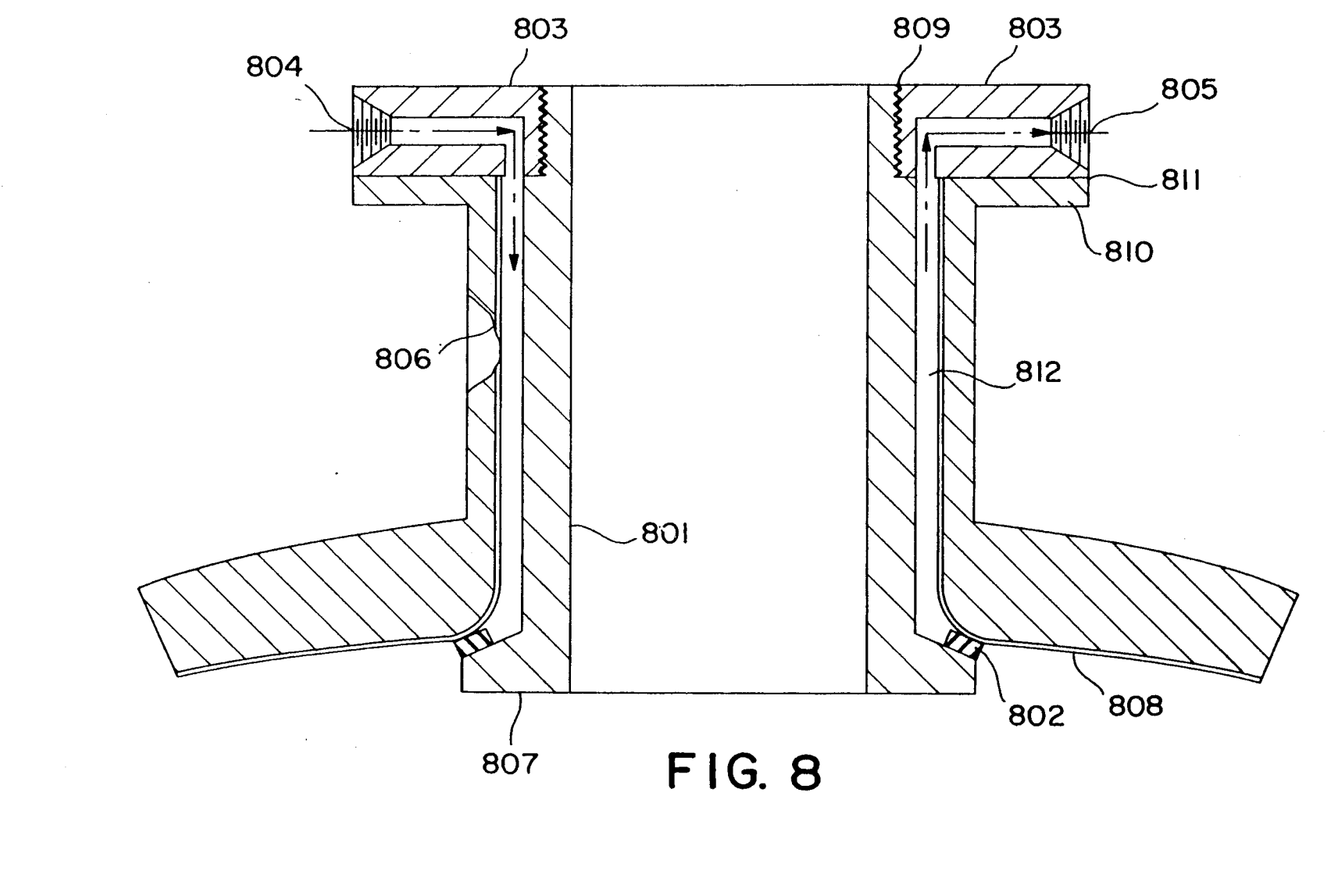
Figure 9:
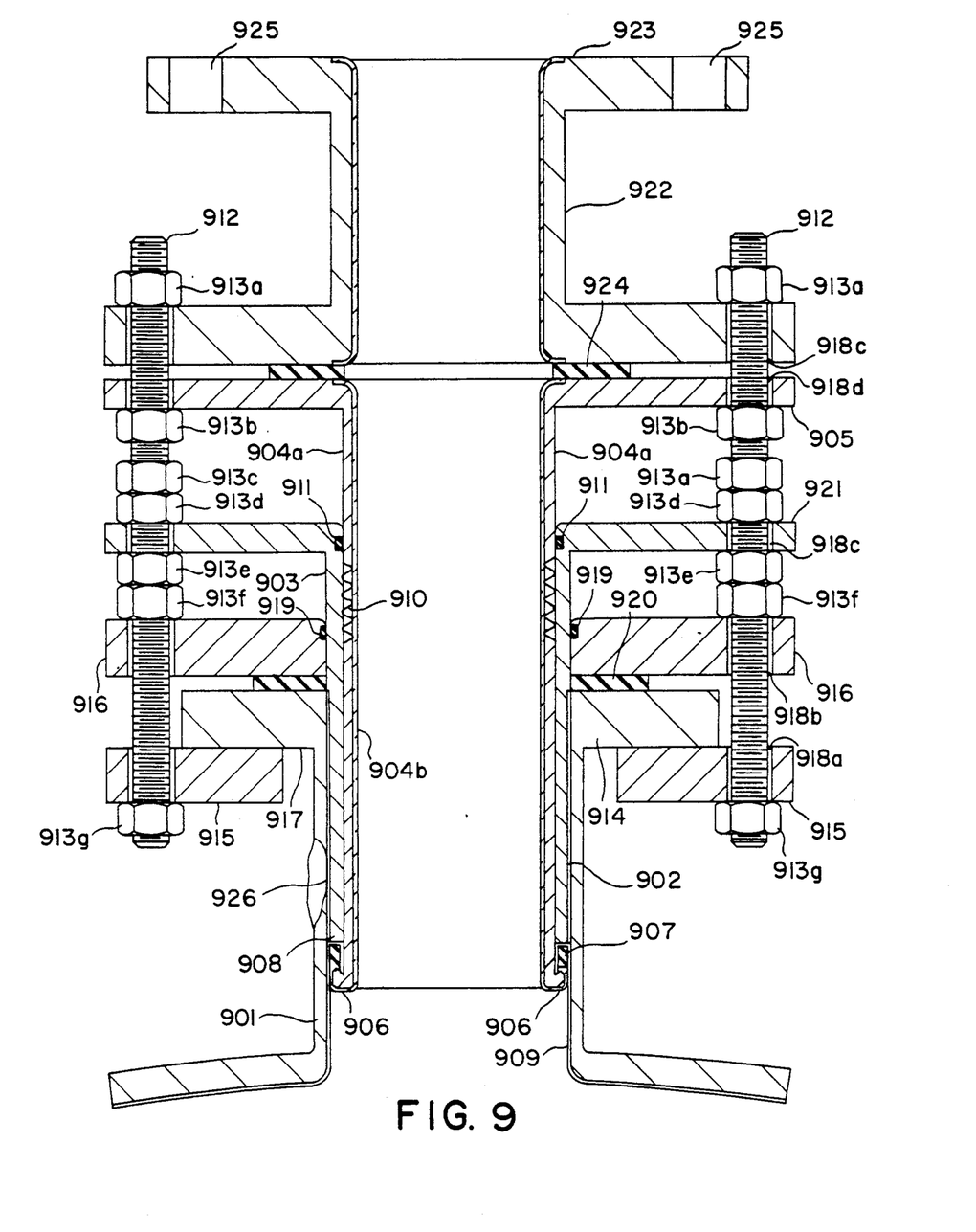
Figure 10:
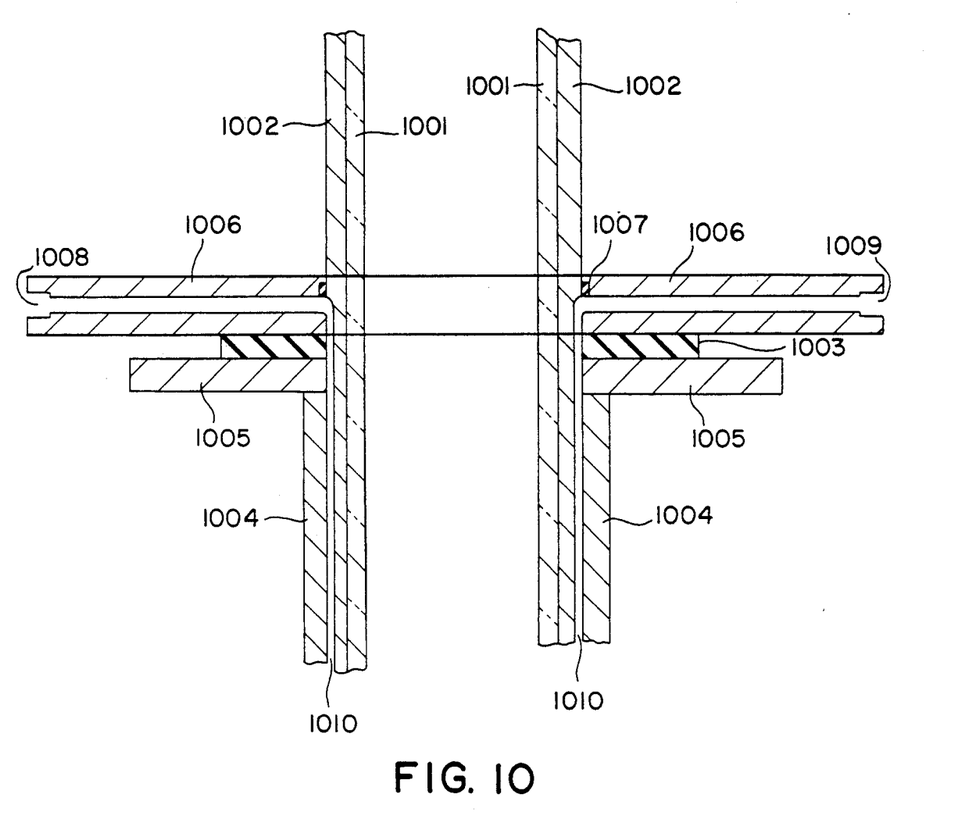

In one embodiment, this present invention provides an apparatus for lining and repairing a vessel port, the vessel port having an inside surface which is damaged, which apparatus comprises: (a) a lining means for lining the inner surface of the vessel port and providing a passage for materials through the port, (b) a purge chamber to allow for passing a gas, preferably a gas which is inert to the materials of the vessel port and lining means, as well as the material(s) stored in the vessel and passing through the port, between the lining means and the inner surface of the original vessel port, (c) a seal which prevents materials from passing from the vessel's interior into the purge chamber, said seal also serving to help secure the lining means into its desired position, (d) one or more means for passing a gas into and out of the purge chamber and (e) one or more means for securing the lining means into the desired position within the open chamber of the original vessel port. It is also considered desirable that the new lining for the vessel port contain a means allowing for the ready coupling of external portions of the apparatus with flow control mechanisms, piping, valves, etc.

This embodiment can be best understood by directing attention to the FIGS. I-V.

FIG. I provides a vertical, cross-sectional view of the present embodiment as it would appear in its working state in a damaged vessel port. The original port extension (101) extends out from the vessel wall (123) to provide a port channel (122) which allows materials to pass between the internal environment of the vessel (120) and an external environment (121). Under normal conditions, the inner surfaces of both the vessel and the vessel port are lined with a protective coating (119) to prevent potentially corrosive materials within the vessel and port from corroding the material comprising the structural outer walls of the vessel and port. This inner lining can be comprised of any material which functions well under the environmental conditions found in the vessel and prevents corrosive material from escaping. Examples of other common lining materials which may be used are rubber (natural or synthetic), TEFLON ® resins, KYNAR ® resins, titanium, tantalum, nickel, nickel/chromium alloys, nickel/molybdenum alloys, graphite, ceramic, glass, etc. The thickness of the inner lining is not critical to the invention. Hence, the liner thickness may be in the range of from about 4 mils or less to about 4 inches or more. It is understood that these same or similar materials may be used in the construction of all of the embodiments of the present invention herein described.

The lined vessel may be a tank, reactor, pump, compressor, heat exchanger, distillation column, evaporator, decanter, and the like having at least one port in fluid communication with the vessel, for ingress and egress of the materials contained within the vessel. Preferably, the lined vessel is a tank, reactor, heat exchanger, or distillation column, and most preferably a tank or reactor.

The vessel may contain any material. This invention has particular application when there is a need for repairing vessels containing corrosive, hazardous and/or lethal fluids. Such fluids include, without limitation, chlorine, bromine, iodine, fluorine, HCl, HBr, HI, HF, $H_2SO_4$, acetic acid, oleum, hydrocyanic acid, NaCl, NaBr, NaI, KCl, KBr, KI, aluminum chloride, aluminum fluoride, aluminum sulfate, NaOH, MgOH, KOH, CO, $H_2S$, benzene, vinyl chloride, chlorobenzene, BrCl, methyl bromide, phosgene, a combination of two or more of the foregoing, or solutions thereof.

One procedure for handling damaged portions (102) of the protective lining and wall of the port have entailed a complete plugging of the vessel port. While this prevents further damage, it also limits or restricts the continued use of the vessel.

The present embodiment of this invention comprises inserting a lining means (103) into the inner chamber (122) of the vessel port to provide a new, protected lining for the port. This new lining means may be of any dimensions which provides a channel (122) through which materials may be passed between the vessel's internal environment and an outside environment. As most vessel ports are columnar in shape, it is preferred that this lining means be of similar geometry. It is more preferred that the lining means be columnar with inner and outer circumferences that allow for both a chamber (110) to exist between the outer circumference of the lining means and also for a maximum inner circumference. The lining means may be made of any material which is desirable based upon the environmental conditions expected during the use of the particular vessel port. Useful materials would include carbon steel, stainless steel, fiberglass reinforced plastic (FRP) and the like. When potentially corrosive materials are to be passed through the new lining means, it is preferred that a protective coating (125) be applied to the exposed surfaces. For handling many corrosive materials, such as bromine, it has been found that a low carbon steel, which has been glassed or ceramic lined on the exposed surfaces, works well as a lining means.

In order to provide a seal between the vessel environment and the chamber (110), an elastomeric material (104) is placed between the outer circumference of the lining means and the inner wall of the original vessel port (119). This elastomeric material forms a seal which helps secure the lining means into position and also limits flow of materials from the vessel into purge chamber 110. Any elastomeric material which provides a secure positioning of the liner and which is inert to the materials stored in the vessel may be used. KALREZ ® and VITON ® elastomers have been found to be useful for this purpose. It is more preferred that the elastomeric sealing material be formed into a band with an inner circumference which allows it to be moved securely over the external surface of the liner means. It is also preferred that the liner means provide a positioning means for holding the elastomeric sealing material into a specified position along the liner's outer surface. Such a positioning means may be formed by two separate extensions of the liner's outer surface (105 and 106). It is understood that this seal could be enhanced by the use of traditional filler materials, but it is preferred that the thickness of the elastomeric seal be such that the seal may perform its desired functions without additional fillers.

In addition to securing the liner and creating a gas-tight seal, the elastomeric sealing material, or first sealing means, also defines the lower extremes of a purge chamber (110) located between the liner means and the inside of the original port. The upper limits of this purge chamber are defined by a second sealing means (109). It is preferred that this second sealing means, like the elastomeric first sealing means, comprise a continuous means encircling the outer surface of the liner means.

The second sealing means may be made of any material which will not degrade under normal working conditions, but it is preferred that it be made of more rigid materials which allow for the rigors of industrial use. An encircling sealing device of low carbon steel has been found to work well. Because of the normal structure of vessel ports, it is preferred that this second sealing means extend from the liner means in a fashion that allows it to align itself against a vessel port's flange (108). The sealing means may then be secured thereto by a coupling means (107), such as a standard industrial clamp. An additional coupling means (106) may then be utilized to secure the second sealing means to the liner means.

FIG. I demonstrates the additional coupling means (100) as a threaded compression means screwed onto a threaded outer surface of the liner means (124). It is understood that the present invention may be modified without departing from this invention's intended scope. The second sealing means could comprise a lateral extension of the liner means, itself. Likewise, the inner surface of the second sealing means could, itself, be threaded to allow it to be rotated securely into its desired position along the outside of the liner means.

In order to provide a gas-tight seal, any spaces existing between the second sealing means (109) and the port flange (108), between the second sealing means and the additional coupling means (100), or between the additional coupling means and the surface of the liner means (124) may be filled by a filler material which effectively seals at least a substantial portion of the spaces. Such filler type materials which may be selected from mastic sealant, Pfauder® A-Filler/Boot Filler, SILOXIRANE® C2131 putty, any similar materials or any combination of two or more of these or similar materials. The use of a conventional gasket or a gasket-like material would also be sufficient for such purposes.

Another preferred embodiment of the present invention is a means of feeding a gas, most preferably an inert gas, through the purge chamber. Should any corrosive materials stored in the vessel pass through the first elastomeric sealing means, they would be swept from the purge chamber by the inert gas before any appreciable amount of corrosion could occur. The inert gas is fed through an inlet means which is in gaseous connection (125) with the purge chamber (110). The inert gas passes around the liner means, sweeping the purge chamber, and exits via an outlet means (112) which is also in gaseous communication (126) with the purge chamber. Such a flow of gas to sweep the purge chamber may be intermittent, but it is preferred that the gas flow be continual.

Another related preferred embodiment of the present invention is the use of a monitoring means in conjunction with the gas sweeping of the purge chamber. The monitoring means comprises an analytical means of screening the exhausted gas to determine if it contains quantities of either the materials stored in the vessel or of atmospheric gases. The presence of either would demonstrate a failure of one of the sealing means. Monitoring means which may be utilized include gas chromatography equipment, metal oxide absorption resistance sensors, a pH or ORP (oxidation/reduction potential) probe, a pressure gauge, a flow meter, a thermal conductivity detector, or two or more of the foregoing, depending upon which monitoring means is compatible with the material to be monitored. It is not critical that the monitoring means be in continuous communication with the purge chamber. However, this communication is highly desirable so that there can be early detection of any failure related to one of the sealing means.

For some purposes, it may be desirable to maintain a substantially constant differential between the purge chamber pressure and the vessel pressure, and/or the purge chamber pressure and the ambient atmosphere. The chamber pressure, however, is not critical to the present invention. Accordingly, the pressure in the purge chamber may be atmospheric, subatmospheric or superatmospheric. In some cases, it is highly desirable to utilize a chamber pressure which is less than the pressure in the vessel so that any potential leakage will be from the vessel into the purge chamber, rather than vice versa. The difference in pressure between the purge chamber and the vessel need not be great and may be as little as 1 psia or less.

It may also be desirable to utilize a purge chamber pressure which is greater than the vessel pressure so that any leakage past the elastomeric sealing means will be into the vessel, rather than into the purge chamber. In such a case, the pressure in the chamber need only be sufficient to provide a differential between the purge chamber pressure and the vessel pressure, e.g., 1 psia or less.

When a purge chamber pressure greater than the vessel pressure is utilized, it is not required that the apparatus contain an outlet means. The chamber can be pressurized with an inert gas via the inlet, which inlet can also be used to monitor changes in the chamber pressure or inert gas flow thereby indicating the condition of the gas-tight sealing means or additional fillers. As it may be possible for a corrosive material stored in the vessel to reach an equilibrium in the purge chamber, it is generally desirable to use an outlet means to maintain a continual purge of the chamber.

It is also preferred that the liner means of the present invention lend itself to ready coupling with standard flow control devices, such as piping, valves, pumps, etc. FIG. I demonstrates the coupling of the liner means with a flanged coupling (127) which provides the external portion of the liner means with an external structure (114) similar to the original vessel port flange (108). In order to do so, a lateral means (113) is attached to and laterally extended from the liner means. When the outer surface of the liner means is threaded, as is seen in FIG. I, it is relatively easy to utilize a lateral means which has a threaded central bore to rotate onto the liner means. Once this is accomplished, standard coupling means (117) may be used to attach the lateral means (113) to similar portions (116) of the flanged coupling. Any gap (118) forming between the liner means and the standard flow control device may be filled (115) with any inert gasket, filler, sealant, etc., which is inert to the materials passing through the liner means.

FIGS. II-V provide vertical, cross-sectional views which demonstrate a method and apparatus for inserting the liner means of FIG. I into a vessel port.

FIG. II provides a view of the first step in inserting the liner means, along with a portion of an apparatus for doing so. A guiding means (205) furnishes a means for guiding the liner means (202) into the damaged port (201). The guiding means is preferably a housing which may be coupled with the port such that a guiding rod (204) may be passed through a bore (211) in the guiding means along a path passing through the central axis of the vessel port. The liner means (202) is secured along the desired axis between a first securing means (209) and a second securing means (207 and 208), both of which are secured to the guiding rod (204). It is preferred that the first securing means comprise a collapsible tool with a first position which extends the tool such that it may be brought into contact with the end of the liner means which is to be inserted into the vessel. Once the liner means is in the desired position, the collapsible tool may then be adjusted to a second position (210) which allows the first securing means to be withdrawn from the vessel through the central chamber of the liner means. A simple spring or tension mechanism may be used to draw the collapsible tool into the second position along a pivotal section of the tool (213).

A second securing means (207 and 208) secures the other end of the liner means along the guiding rod. FIG. II illustrates this second securing means as a plate or series of plates having a central bore (212) which allows passage therethrough of the guiding rod (204), perpendicular to the rod's central axis, and which sit on externally- located end of the liner means. The plate or series of plates is then secured against the liner means by a first adjustable clamping means, such as a wing nut, industrial clamp, etc.

Once the liner means is secured by the first and second securing means, it may be inserted into the vessel port by passing the guiding rod (204) through the bore (211) in the guiding means. FIG. II also depicts the position of the elastomeric seal (203), which may be placed along the outer wall of the liner means and inserted along with the liner means into the position depicted.

FIG. III illustrates the remainder of the apparatus useful in placing the liner means into the vessel port. A seal guiding means (306, 308, 310 and 312) is utilized to hold the elastomeric seal in its desired position, i.e. prevent the elastomeric seal from being withdrawn as the liner means is pulled from the position depicted in FIG. III into FIG. V.

The seal guiding means comprises a first plate (306), two or more first push rods (308), a second plate (310) and two or more second push rods (312). The first plate has a central bore (307) which allows it to pass perpendicularly along the guiding rod (304) in positions external to the housing of the guiding means (305). The two or more first push rods (308) contact the first plate (306) at their external end and pass through bores in the guiding means (309) to contact the second plate. The second plate is located within the housing of the guiding means (305) and also contains a central bore (311) which allows the guiding rod to pass therethrough. The second push rods (312) contact the second plate and extend parallel to the guiding rod such that they may be inserted between the liner means and the walls of the vessel port to a position where they contact the elastomeric sealing means (313).

FIG. IV illustrates the use of the apparatus in moving the elastomeric sealing means (408) into the desired position (409). By forcing the first plate (402) along the guiding rod (403) in the direction of the vessel port (410), the resulting movement of the first push rods (404), through the housing of the guiding means (401), and the second plate (405) forces the second push rods (406 and 407) to move the elastomeric sealing means along the length of the liner means (412). It is preferred that the second push rods be only of sufficient length (411) to push the elastomeric sealing means to the desired position (409) along the liner means (412). Once the elastomeric sealing means is in this desired position, the guiding rod may be withdrawn from the vessel to a position which brings the liner means to a position in which the elastomeric sealing means fits securely between the most inner portion of the liner means and the most inner portion of the vessel port. This is the final position in which the liner means will function as the new inner lining of the vessel port.

FIG. V illustrates the positioning of the liner means (509) once it has been withdrawn to this final, working position inside the vessel port (510). In this final position, the elastomeric sealing (504) means provides the first sealing means. The second sealing means (505), the coupling means (507), coupling with the vessel port flange (506), and the additional coupling means (508), which is shown above its working position, can be added to create the purge chamber (513) that may be in gaseous contact with an outside environment via the inlet means (511) and the outlet means (512). Once the liner means is thus secured, the guiding rod (501) and the first (503) and second (502) securing means may be removed.

FIG. VI is a vertical, cross-sectional view of a simpler version of the present invention which, because of its simplicity, is more preferred for certain uses. This version provides a liner means (602) which may be inserted into a damaged vessel port (601) without the use of an additional guiding means. This version also provides a means of repairing a vessel port by inserting a single, preassembled device.

The liner means (602) maintains two lateral projections (603 and 604) around its outer circumference which are separated by a space (605) sufficient to securely house a first sealing means (606), such as a band or ring of elastomeric material. This sealing means (606) defines the lower boundaries of the purge chamber (613), which is gaseously connected to the inlet (608) and outlet means (609). It is understood that the seal at this inner portion of the liner means may comprise more than one series of lateral projections and elastomeric sealing means. A series of such seals could be used, providing that none of the seals covers a damaged area of the original port wall. The top of the purge chamber is defined by the second sealing means (610), which is shown incorporated as a lateral extension of the liner means (602). FIG. VI illustrates the connecting surfaces (611) between the liner means (602) and the second sealing (610) means as interlocked threaded surfaces. It is to be understood that any solid means of coupling, or a solid weld or one-piece construction serving both functions, could be acceptable.

This embodiment of the present invention may be preferred as it can be inserted into a vessel port by hand and secured to the vessel port flange by a single coupling means (not shown). In addition, the lateral second sealing means corresponds with and serves a similar function to the flange (612) of the original vessel port. Therefore, standard flow devices can be readily attached over the lateral second sealing means.

The portions comprising this embodiment of the invention may be constructed of the harder materials mentioned above. They may also be comprised of softer materials, such as a TEFLON ® resin. It should be noted that liner means of softer materials, such as TEFLON ® resin, may not maintain their strength at higher temperatures or pressures. Likewise, the design for the first sealing means (606) depicted in FIG. VI may not have the strength to resist greater pressures as the version depicted in FIGS. I–V. Therefore, one skilled in the art may wish to limit use of this easier-to-use embodiment of the present invention depicted in FIG. VI to conditions in which the vessel port is operated at lower temperatures and pressures.

FIG. VII provides a view in perspective of the embodiment depicted in FIG. VI. Illustrated are the first sealing means (701), body of the liner means (702), the second sealing means (703) and the outlet means (704). Also depicted, in part, is another more preferred embodiment of the present invention, a gas flow regulating means (705). It is highly desired to direct the flow of gas through the purge chamber such that it effectively sweeps the entire atmosphere of the purge chamber. This prevents the flow of gas from taking the path of least resistance between the inlet means and the outlet means (704), therefore preventing the buildup of potentially corrosive materials. As depicted, the gas flow regulating means comprises a series of alternating lateral projections extending from the wall of the liner means. These projections approach the inner wall of the original vessel port and create a series of channels which direct the flow of gas as it passes around the liner means (702) towards the outlet means (704). Any series of channels, ridges, tubes, fins, etc., or other means which directs the flow of gas around the chamber to more effectively sweep the chamber atmosphere is considered useful for this more preferred embodiment. The existence of these projecting gas flow regulating means also provides additional structural support for the liner means. These means would restrict the amount that a high pressure in the port could deform the liner means so that it reduces the purge chamber volume.

FIG. VIII provides a vertical, cross-sectional view of a further embodiment of the present invention. This version is similar to the more simplified version seen in FIGS. VI and VII, however, this embodiment requires insertion into the vessel port from inside the vessel, and may be used for higher pressure conditions.

This embodiment comprises a liner means (801), a first sealing means (802), a second sealing means (803), an inlet means (804) and an outlet means (805). The liner means (801) is inserted into the vessel port (806) from inside the vessel in a position in which the encircling lateral projection (807) extending from the innermost terminus of the liner means (801) is separated from the inner surface of the vessel (808) only by the first sealing means (802). Then the second sealing means (803) is secured to the liner means (801) in a manner which draws the liner means in the direction of the ports external end. This is depicted in FIG. VIII by corresponding threaded surfaces (809) of the liner means and the second sealing means. This drawing action creates a tighter seal at both the location of the first sealing means (802) and at the interface (811) between the second sealing means (803) and the port flange (810). For additional sealing strength, an additional coupling means, such as bolts or a standard industrial clamp, may be used to seal the second sealing means (803) to the port flange (810). It is also understood that an additional conventional sealing means, such as a gasket or sealant material, may be placed between the interfacing surfaces of the second sealing means (803) and the port flange (810), though for many applications this may not be necessary.

As with the embodiments illustrated in FIGS. VI and VII, the embodiment of FIG. VIII utilizes an inlet means (804) and an outlet means (805) to sweep gases from the purge chamber (812) located between the liner means (801) and the damaged vessel port (806).

FIG. IX provides a cross-sectional view of a final embodiment of the present invention. The depicted method and apparatus for repairing a damaged vessel port (901) is similar to those of the previously mentioned embodiments. However, this new embodiment provides a means of repair which (a) allows a greater port diameter in the repaired port and (b) allows the innermost sealing means to be placed in a variety of positions against the inner surface of the damaged vessel port.

Rather than a single lining means, as seen above, this final embodiment utilizes a series of two liner means. FIG. IX demonstrates the first lining means (904a and b) inserted into the damaged vessel port (901). A surrounding lateral projection (906) extends from the outer surface of the first lining means such that its most lateral portions are in close proximity to the inner surface of the vessel port (909). It is preferred that this surrounding lateral projection extend from the inserted first lining means at or near the innermost portion of the lining means.

Immediately above this surrounding lateral projection (906) is placed a first sealing means (907), which surrounds the outer surface of the first lining means above the surrounding lateral projection (906) and may be comprised of an elastomeric material which will not readily be degraded by contact with the material stored in the vessel. Examples of a preferred material for this first sealing means are the Style 6000 MONOSEAL and Style 8000 SUPER PARACHUTE Packings produced by the A. W. Chesterton Company.

In order to form a tight seal utilizing the first sealing means (907), the second lining means (903) is inserted into the vessel port along the outer wall of the first lining means (904a and b). The dimensions of the first (904a and b) and second lining means (903) should be such that the second lining means (903) slides easily over the outer surface of the first lining means (904a and b). It is also most preferred that the space between the two lining means be as small as practicable.

As the second lining means (903) is inserted along the first lining means (904a and b), the innermost portion (908) of the second lining means (903) compresses the first sealing means (906) against the surrounding lateral projection (906) such that it expands laterally to create a seal between the outer surface of the first lining means (904a and b) and the inner surface of the vessel port (909).

From the view presented in FIG. IX, it is evident that the outer flange (905) and the surrounding lateral projection (906) of the first lining means (904a and b) would not allow the second lining means (903) access to the position shown. Therefore, the first lining means (904a and b) consists of two separable portions. The upper portion of the first lining means (904a), which is attached to the flange (905), couples with the lower portion (904b) via a coupling means (910). The coupling means (910) is illustrated in FIG. IX by corresponding threaded surfaces on each of the portions of the first lining means (904a and b). It is understood that any means which allows the coupling and uncoupling of the two portions, while providing a relatively gas-tight seal, may be utilized. This ability to uncouple the two portions (904a and b) of the first lining means allows the first sealing (907) means to be positioned above the surrounding lateral projection (906) of the lower portion (904b). Then the second lining means (903) can be placed into the position surrounding the lower portion (904b), as depicted in FIG. IX. Thereafter, the upper portion (904a) may be coupled with the lower portion (904b) to complete the first lining means (904a and b).

As with the previously mentioned embodiments, this final embodiment provides a purge chamber (902) which allows the evacuation and monitoring of the gas which is located between the present apparatus and the inner lining (909) of the vessel port. The purging nature of this final embodiment will be discussed further in the description of FIG. X, below.

The portions of this final embodiment are secured and adjusted along a series of actuator rods (912). While it is possible that a single actuator rod could be used, it is preferred that the present embodiment utilize two or more actuator rods which are evenly spaced around the apparatus, substantially parallel to the central axis of the vessel port. It is also preferred that each portion of this embodiment which is to be secured and adjusted by the rods have a series of lateral bores (918a–918e) through which the actuator rods (912) may pass. It is preferred that the lateral bores (918a–e) have a diameter which allows the actuator rod (912) to pass and rotate upon its central axis, but limits the rod's lateral motion. It is further preferred that the each actuator rod (912) have a series of coupling means which allow portions of the apparatus to be secured at desired points along the actuator rod (912). A preferred means of accomplishing this function is to use a threaded actuator rod which utilizes corresponding threaded nuts (913a–913g) as the coupling means, as depicted in FIG. IX.

The present apparatus is secured to the flange (914) of the vessel port (901) by a clamping action between a lower clamping plate (915) and an upper clamping plate (916). Each of these plates lies substantially perpendicular to, and is capable of being secured to, the actuator rods (912), preferably by the lateral bore (918a–e) and threaded actuator rod (912)/threaded nut (913a–g) method mentioned above. The lower clamping plate (915) lies substantially parallel to, and is in surface contact with, the lower surface (917) of the vessel port flange (914). This lower clamping plate (915) may comprise a single encircling plate, such as a split loose flange, which encircles the vessel port (901) or may comprise a series of individual plates, one for each actuator rod used (912).

The upper clamping plate (916) lies in a plane substantially parallel to the lower clamping plate and may comprise either a single plate encircling the vessel port (901) or a series of single plates, one for each actuator rod (912). Due to the need for a second sealing means (911) in conjunction with the upper clamping plate (916), a single plate is preferred. The upper clamping plate further comprises a means of attachment to an actuator rod (912), preferably the lateral bore (918b)/threaded actuator rod (912) method described above and demonstrated in FIG. IX. If this method is used, the lateral bore (918b) should be located such that the bore (918b) may be aligned with the lateral bore (918a) of the lower clamping plate (915), thus allowing a single actuator rod to pass easily through both plates. It should also allow the second sealing means (919) to create a gas tight seal against the second lining means (903).

The upper clamping plate (916) should further comprise a means of forming a gas-tight seal between the upper clamping plate (916) and the outer wall of the second lining means (903). The second sealing means may comprise any means which allows a gas-tight, inert seal to define the upper limit of the purge chamber (902). It is preferred that the upper clamping plate (916) further comprise an indentation in its surface which is in closest proximity to the second lining means (903). An elastomeric sealing means (919) may then be secured by incorporation into the indentation. A gas-tight seal can then be accomplished when the elastomeric sealing means is compressed between the upper clamping plate (916) and the outer wall of the second lining means (903).

A third sealing means (920) encircles the vessel port (901) and allows the formation of a gas-tight juncture between the upper clamping plate (916) and the vessel port flange (914). It is preferred that this third sealing means (920) also comprise an elastomeric material which is inert to the materials stored in the vessel.

The gas-tight seal between the upper clamping means (916) and the vessel port flange (914), as well as the coupling which secures the entire apparatus to the vessel port (901), occurs when the threaded nuts (913g) below the lower coupling plate (915) and the threaded nuts (913f) above the upper coupling plate (916) are rotated towards each other on the threaded surfaces of the actuator rods (912). As the clamping plates (915 and 916) are drawn towards each other, the third sealing means (920) is compressed. This action creates both a gas-tight seal and a secure clamping of the apparatus to the vessel port flange (914).

FIG. IX also illustrates the attachment of the first (904) and second lining means (903) to the actuator rods (912) in a similar fashion, i.e. actuator rods (912) passing through lateral bores (918c and d), followed by the coupling action of threaded nuts (913b–e). This relationship allows the two lining means to be moved in relation to each other, as well as in relation to the inner surface (909) of the vessel port (901), by the rotation of the threaded nuts (913b–e) on the threaded actuator rods (912). For proper operation, it is highly preferred that the two lining means be moved to a position such that the operating first sealing means is located further into the vessel port (901) than the port's damaged portion (926).

When the desired positions for the two lining means (903 and 904) have been obtained, a fourth sealing means (911) may be used to create an additional gas-tight seal between the first (904) and second lining means (903). This fourth sealing means (911) may be similar to that between the upper clamping plate (916) and the second lining means (903), i.e. an indentation in the innermost wall of the second lining means which is filled with an elastomeric sealing material. This fourth sealing means (911) provides an additional gas-tight seal in case any gases pass the first sealing means (907) and travel between the first (904) and second lining means (903).

FIG. IX illustrates an additional threaded nut (913c) to indicate that additional nuts may be used for an additional securing of the apparatus along the actuator rods (912), but are not mandatory. Conventional securing means, such as lock washers, may also be utilized for added security. It is also to be understood that, while the nuts (such as 913e and f) illustrated in FIG. IX may be in contact with each other, such contact is not required and may not occur in actual use of the device. By varying the dimensions of the portions of the present apparatus, one skilled in the art could easily alter their desired locations on the actuator rods (912) without straying from the focus of the present invention.

Finally, FIG. IX illustrates the attachment of an external adaptor means (922) which provides an external flange (923) which is similar to the original port flange (914). This allows the newly repaired vessel port to couple with conventional piping and equipment. The external adaptor means (922) utilizes lateral bores (918e) through which the actuator rods (912) may pass. Then a coupling means, such as a threaded nut (913a) may be used to secure the external adaptor means (922). A fifth sealing means (924), similar in composition and function to the third sealing means (920) discussed above, may be located between the flange (905) of the first lining means (904) and the lower surface of the external adaptor means (922) to maintain the integrity of the system. FIG. IX also illustrates a series of lateral bores (925) in the upper flange (923) of the external adaptor means (922). These lateral bores are optional, with their presence to be determined by the coupling needs of any equipment to be attached to the external adaptor means (922).

The cross-sectional view provided by FIG. IX demonstrates the view of a plane through a series of actuator rods and, thus, does not allow a view of the inlet means and outlet means that evacuate the purge chamber (902). The limited FIG. X provides a view of these additional features in the final embodiment illustrated by FIG. IX.

As points of reference, FIG. X provides a cross-sectional view of the first lining means (1001), the second lining means (1002), third sealing means (1003), the original vessel port (1004) and vessel port flange (1005), the upper clamping plate (1006) and the second sealing means (1007). Into this upper clamping plate (1006) is introduced an inlet means (1008) and an outlet means (1009) which are in gaseous connection with the purge chamber (1010). As with the previously mentioned embodiments, the inlet (1008) and outlet (1009) means allow for the evacuation and monitoring of the gases in the purge chamber (1010).

From the foregoing specification, it is understood that the present invention may be subject to alterations without departing from the spirit and scope of the following claims.

What is claimed is:

1. A method of repairing a port of a vessel, the port having an inside surface which is damaged, which method comprises:
    (1) positioning into the port an apparatus comprising
        (a) a lining means for providing a passage for materials through the port, (b) one or more chamber forming means for forming, between said lining means and the inner surface of the port, a chamber, (c) an inlet and an outlet, which inlet and outlet are both in gaseous communication with said chamber, and (d) one or more sealing means for securing the lining means into the port and for preventing the flow of materials from the vessel into the chamber;
    (2) feeding an inert gas via the inlet;
    (3) continually exhausting the fed gas via the outlet.

2. The method of claim 1 wherein the inert gas is nitrogen or argon.

3. The method of claim 1 wherein one or more sealing means for securing the lining means into the port and for preventing the flow of unwanted materials into the chamber is an elastomeric material located between the lining means and the inside surface of the port.

4. The method of claim 3 wherein the elastomeric material is KALREZ ® or VITON ® elastomer.

5. The method of claim 1 wherein one or more means for directing the flow of the inert gas are located within the chamber.

6. The method of claim 1 further comprising monitoring said outlet.

7. An apparatus for repairing and using a port of a vessel, the port having an inside surface which is damaged, which apparatus comprises:
    (a) a lining means for lining the inner surface of the port and for providing a passage for materials into and out of the vessel through the port;
    (b) one or more chamber forming means for forming a chamber between said lining means and the inner surface of the port;
    (c) an inlet and an outlet, which inlet and outlet are both in gaseous communication with said chamber;
    (d) a means for feeding an inert gas into the chamber via the inlet; and
    (e) one or more sealing means for securing the lining means into the port and for preventing the flow of unwanted materials into the chamber.

8. The apparatus of claim 7 further comprising a means for continually feeding an inert gas via said inlet, and continually exhausting the fed gas via said outlet.

9. The apparatus of claim 8 further comprising a monitoring means in gaseous communication with said outlet for determining the presence in the exhausted gas of a material contained within the vessel, atmospheric gases, or both a material contained within the vessel and atmospheric gases which may have leaked into the chamber.

10. The apparatus of claim 9 wherein the monitoring means is a gas chromatograph.

11. The apparatus of claim 8 wherein the inert gas is nitrogen or argon, and the monitoring means is a metal oxide absorption resistance sensor.

12. The apparatus of claim 11 further comprising one or more means for directing the flow of inert gas through the chamber.

13. A method for repairing and using a port of a vessel, the port having an inside surface which is damaged, which method comprises:
    (1) positioning into the port an apparatus comprising
        (a) a lining means for lining the inner surface of the port and providing a passage for materials into and out of the vessel through the port, (b) a first sealing means for forming a gas-tight seal between the lining means and the inner surface of the port, (c) a second sealing means for forming a second seal between the lining means and said port at a location displaced from said first sealing means whereby a chamber is provided between the first and second sealing means, and (d) an inlet, which inlet is in gaseous communication with said chamber;
    (2) feeding an inert gas via said inlet so as to pressurize said chamber to a pressure at least above the vessel pressure; and
    (3) monitoring said chamber via said inlet.

14. The method of claim 13 wherein the inert gas is nitrogen or argon.

15. The method of claim 13 wherein said second sealing means is a gas-tight sealing means.

* * * * *